Oct. 9, 1928.

O. B. ROSS

STOCK CASTRATER

Filed Dec. 23, 1927

1,686,990

O. B. Ross
Inventor

By C. A. Snow & Co.
Attorneys.

Patented Oct. 9, 1928.

1,686,990

UNITED STATES PATENT OFFICE.

OTLEY B. ROSS, OF NOVINGER, MISSOURI.

STOCK CASTRATER.

Application filed December 23, 1927. Serial No. 242,086.

This invention relates to castraters, and aims to provide a device to be clamped on the scrotum to cut gradually under an even pressure, to the end that after the castrater has been worn for several days, the testicles will drop away from the animal, and the opening caused by the operation will be practically healed.

Another object of the invention is to provide means for disinfecting the cut portions of the scrotum to insure against infection and annoyance to the animal by flies.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
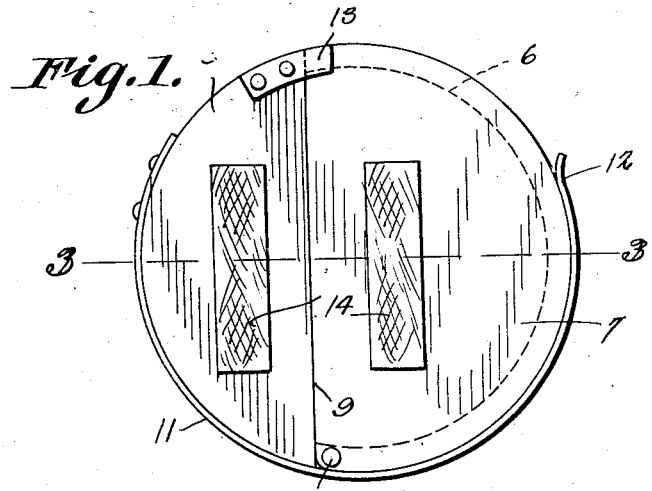
Figure 1 is a plan view showing the device in its closed position.
Figure 2:
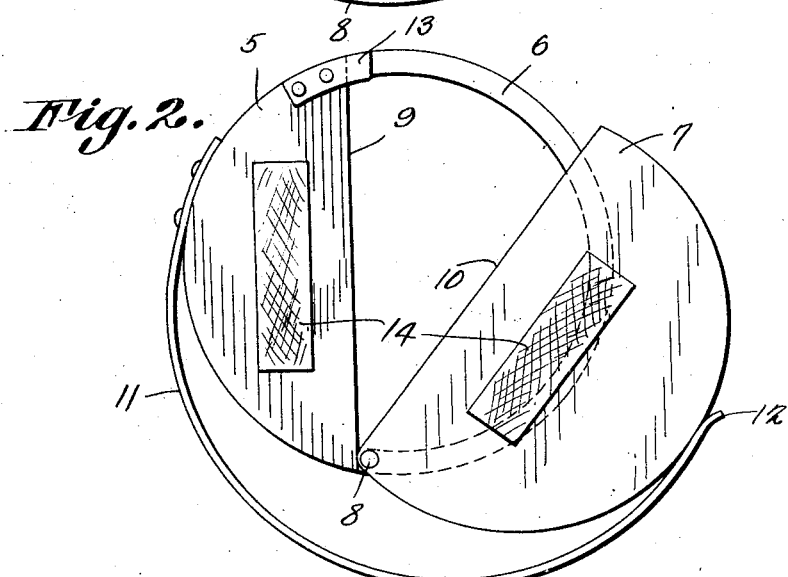
Figure 2 is a plan view showing the device in a partially open position.
Figure 3:
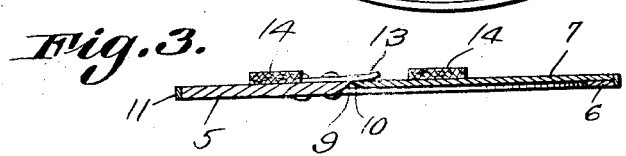
Figure 3 is a sectional view taken on line 3—3 of Figure 1.

Referring to the drawing in detail, the device includes a circular body portion formed of suitable material and having one side thereof cut away providing a substantially flat surface 5, and a circular portion 6, the circular portion defining a support for the pivoted blade 7, which is pivotally connected thereto as at 8.

One edge of the member 5 is beveled defining a cutting edge 9 that cooperates with the cutting edge 10, of the blade 7 in accomplishing the purpose of the invention.

Secured to one edge of the member 5 is a spring member 11 that has its free end curved slightly outwardly as at 12, the portion of the spring adjacent to the outwardly curved end resting against the blade 7 to normally urge the blade 7 into cooperative relation with the cutting edge 9.

Thus it will be seen that due to the construction shown and described, the spring 11 will act to force the blade inwardly slowly, and under a constant pressure.

Secured to the member 5, is a finger 13 arranged in spaced relation with the portion 6, the space between the finger 13 and portion 6 accommodate the blade 7 when the blade has been moved to its active position.

Mounted on the upper surface of the blade and member 5 are strips of felt 14 which come in contact with the scrotum after it has been cut to disinfect the same and reduce bleeding to the minimum, it being understood that these felt strips are saturated with a suitable medicine for accomplishing this result.

In the use of the device, the blade is moved to its open position whereupon the device is positioned so that the scrotum of the animal will live within the opening between the blades, the movable blade acting as a means for clamping the device to the scrotum.

The pivoted blade now acts under the action of the spring 11 which tends to force the blade inwardly, slowly cutting the scrotum, arteries, veins and spermatic cords at a point close to the testicles, with the result that after the device has been worn for several days, the testicles will drop away from the animal, and the opening caused by the operation will be practically healed.

I claim:

1. In a device of the character described, a body portion to be worn over the scrotum of an animal, said body portion including a stationary blade and a movable blade, and means engaging the movable blade to exert a gradual pressure on the movable blade to cut the scrotum held between the blades.

2. In a device of the character described, a body portion adapted to be worn over the scrotum of an animal, a body portion including a stationary blade and a movable blade to clamp the body portion to the scrotum, and means for gradually urging the movable blade towards the stationary blade, and absorbent members carried by the blades.

In testimony that I claim the foregoing as my own, I have hereto affixed my signature.

OTLEY B. ROSS.